Sept. 21, 1965 F. SOLOMON ETAL 3,207,630
ELECTRODE ASSEMBLY
Filed June 27, 1961 2 Sheets-Sheet 1

INVENTORS:
FRANK SOLOMON
ALBERT HIMY
BY
Irving Hollyman
ATTORNEY

Sept. 21, 1965   F. SOLOMON ETAL   3,207,630
ELECTRODE ASSEMBLY
Filed June 27, 1961   2 Sheets-Sheet 2
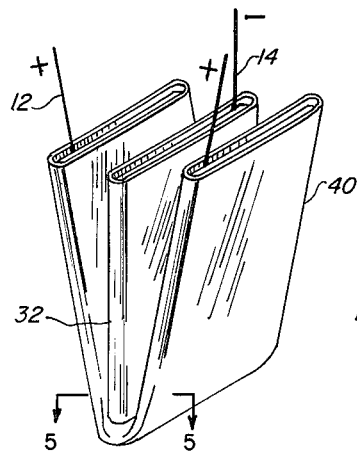
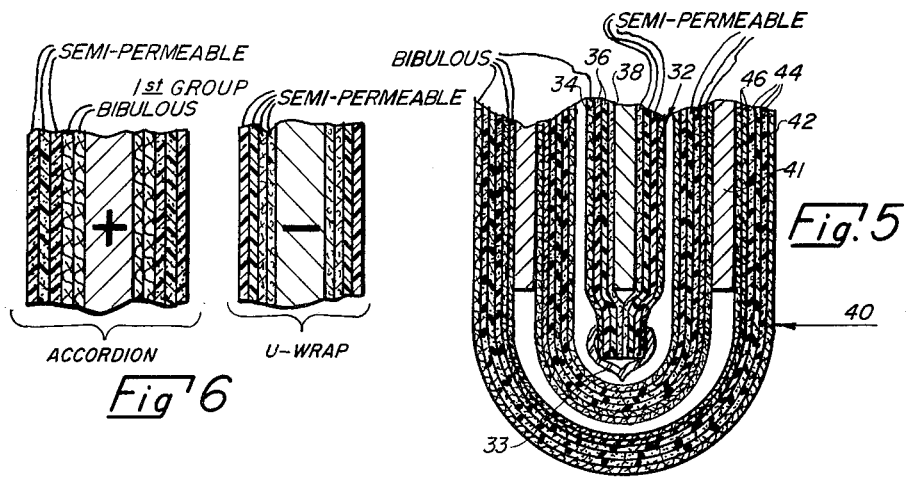
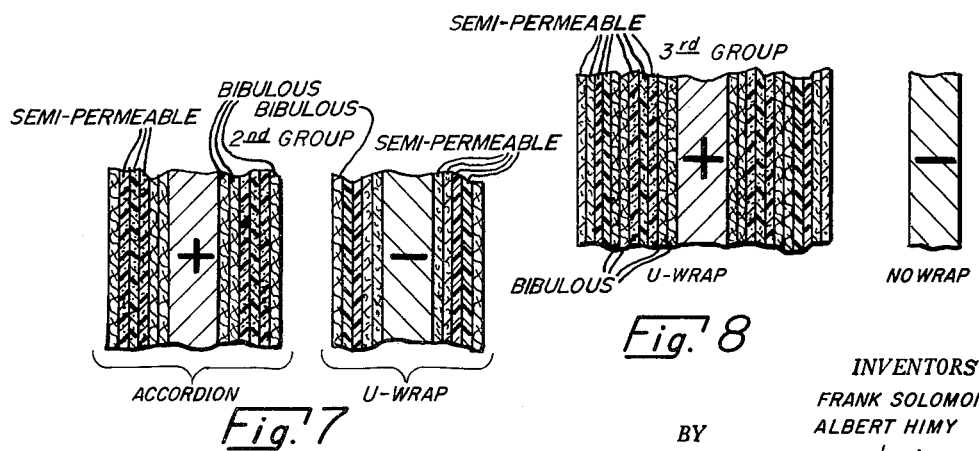
INVENTORS:
FRANK SOLOMON
ALBERT HIMY
BY
Irving Holtzman
ATTORNEY

United States Patent Office 3,207,630
Patented Sept. 21, 1965

3,207,630
ELECTRODE ASSEMBLY
Frank Solomon, Lake Success, and Albert Himy, Elmhurst, N.Y., assignors to Yardney International Corp., New York, N.Y., a corporation of New York
Filed June 27, 1961, Ser. No. 119,867
5 Claims. (Cl. 136—6)

This invention relates to electrochemical devices and, more particularly, to storage batteries or accumulators. It has particular application to alkaline batteries and especially to alkaline batteries having negative electrodes whose active materials are zinc or cadmium and positive electrodes whose active materials are more electropositive than zinc or cadmium, e.g. silver.

One of the chief problems encountered in the service of these and other types of batteries is the maintenance of their capacity at high and constant values over repeated cycles of charging and discharging. This capacity is reduced by several factors among which are:

(1) The reduction in the effective surface areas of the electrode caused by the loss in shape of the electrodes and particularly the negative zinc electrode; and (2) The penetration of the separator materials by metallic bridges or dendrites of active material, e.g. zinc, which grow across the separator materials and short the cell.

To improve the performance of alkaline batteries in this respect it has been proposed to construct alkaline silver-zinc cells with preshaped electrodes and to wrap one of the electrodes in one or more layers of separator material. These batteries have shown good performance but do, after prolonged cycling, show a loss of capacity.

It has now been found that the loss of effective surface area of an electrode (particularly the zinc electrode) and the consequent loss in capacity of a cell brought about by the cycling of a battery may be significantly reduced by separately wrapping both the preshaped positive electrode and the preshaped negative electrode in the semipermeable separators. By preshaped is meant that the electrode is formed or shaped before its insertion into the separator material and is not dependent on the separator material for its support. Any of a variety of separators may be used for this purpose, including silver cellulosate films, polyvinyl alcohol films, regenerated cellulose films, carboxyated polyethylene films and similar semi-permeable sheet materials.

The performance of the cell is further improved and the zinc penetration of the separator materials is still further reduced if there is provided between the electrodes means for improving the electrolyte irrigation between the electrodes. In the preferred mode of realization of this invention this takes the form of at least one outside wrapping for one electrode which is made of a material having a wick-like action. Examples of bibulous material which will function in this manner are nylon woven fabrics and paper.

It is accordingly an object of the present invention to provide an electrode assembly for an electrochemical generator which serves to maintain the capacity of said battery over extended cycling thereof.

It is a further object of the present invention to provide an electrode assembly which reduces the loss of effective electrode surface during prolonged cycling of an electrochemical generator containing the same.

It is also an object of the present invention to provide an electrode assembly for an electrochemical generator which reduces the metal penetration of the electrode through the separators.

Other and more detailed objects will be apparent from the following description and the accompanying drawing wherein:

FIG. 4 is a perspective view of another embodiment of this invention;

FIG. 5 is an enlarged fragmentary sectional view taken along line 5—5 of FIG. 4;

FIG. 6 is a diagrammatic representation similar to FIG. 3, of the relationship of the various layers of separator material to the electrodes in another modification of this invention;

FIG. 7 is a diagrammatic representation of the relationship of various layers of separator materials to the electrodes in still another modification of the invention; and FIG. 8 is a diagrammatic representation of the relationship of various layers of separator materials to electrodes in a control group prepared for the purpose of comparing it with the various embodiments of this invention.

Figure 1:
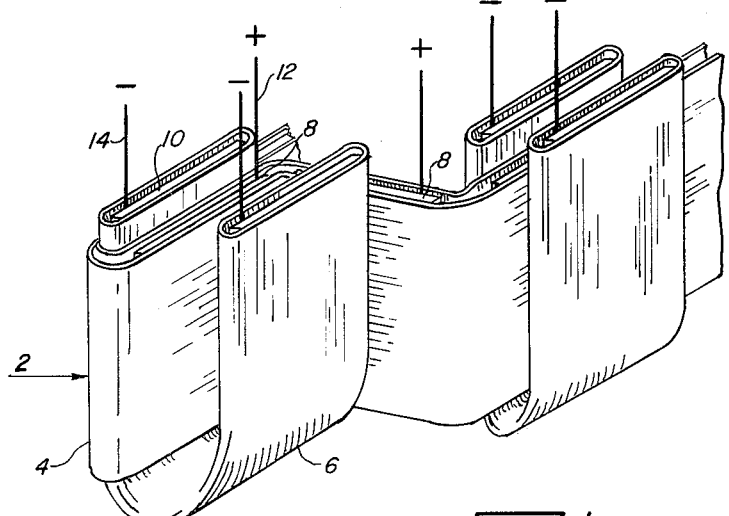
FIG. 1 is a perspective view of an electrode assembly prepared in accordance with the present invention.
Figure 2:
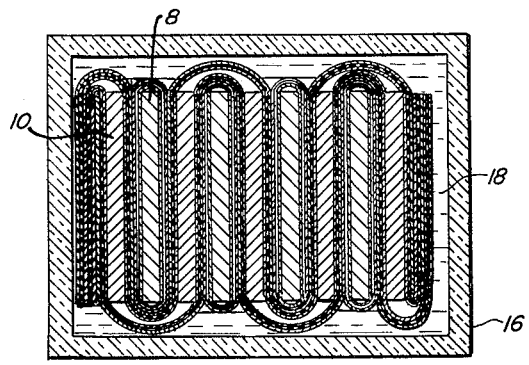
FIG. 2 is a cross-sectional view of the electrode assembly shown in FIG. 1 positioned in a battery casing.

In FIG. 1 an electrode assembly is shown at 2 and comprises an accordion-wrap section 4 and a U-wrap section 6. The positive electrodes 8 are contained within the folds of the accordion-wrap 4 and a negative electrode 10 is contained within folds of each leg of the U-wrap section 6. Each positive electrode 8 is provided with a lead 12 and each negative plate 10 is provided with a lead 14. The electrode assembly is disposed in a battery casing (FIG. 2) which contains electrolyte 18.

The present electrode assembly has particular utility in alkaline batteries having silver positive electrodes and zinc negative electrodes. The silver positive electrode is, preferably, a preshaped sintered silver electrode, for example, as prepared in accordance with U.S. Patent 2,818,-462. The negative zinc electrode is preferably a zinc oxide negative which is prepared by pressing zinc oxide powder on a thin perforated zinc sheet with or without a binder. The electrolyte is preferably aqueous KOH (44%) although different concentrations and different electrolytes may be employed.

Although these are the preferred electrodes and electrolytes used in accordance with the present invention, it is to be understood that this invention is not limited thereto. It may, for example, be used in connection with silver-cadmium cells, nickel-cadmium cells and the like.

Figure 3:
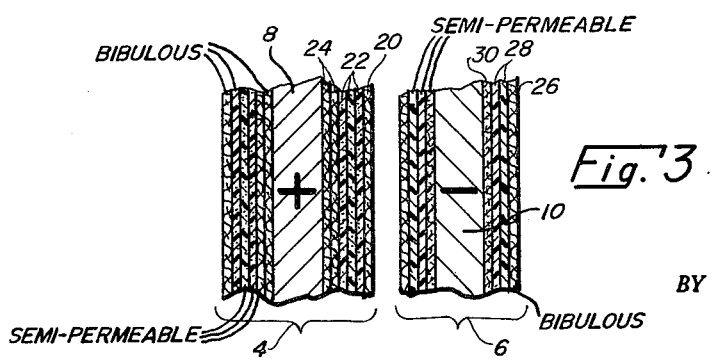
FIG. 3 is a fragmentary sectional view of the assembly of FIG. 1, drawn to a larger scale.

FIG. 3 illustrates one arrangement of separator wraps employed in an assembly embodying the present invention. The accordion wrap 4 is formed by stacking sheets of separator materials in the following order: 1 bibulous sheet of woven nylon fabric 20 hereinafter referred to as nylon; 3 semi-permeable sheets, 22, of silver cellulosate film sprayed with a sulfonated polystyrene powder suspended in a polystyrene-butadiene latex emulsion hereinafter referred to as "P," and then 2 bibulous sheets, 24, of additional nylon. The nylon employed may be a hexamethylene diamine/adipic acid copolymer having a molecular weight of more than about 10,000. The nylon woven fabric preferably has a thickness of about 2.2 to 2.3 mils and a weight of about 1 oz. per square yard. The thread count as determined by a comparator is preferably as follows:

End count _____ 98–116
Fill count _____ 108–116

Furthermore, the nylon woven fabric is preferably of 30 denier.

The "P" separator, preferably, has a thickness of about .0013 to .0016 in. and weighs from 2.80 to 3.00 grams per 100 in.$^2$.

A plurality of positive electrodes with their leads extending upwardly are arranged so that they are spaced from one another and their upper edges are adjacent the upper edges of the stacked separator sheets. The stack of separator materials is then folded horizontally along the midline so that the lower edge thereof is brought upwardly to enclose the electrodes. The assembly is then folded vertically in alternate directions along lines which run between electrodes, thus forming an accordion-like structure which encloses the positive electrodes.

The U-wrap separator section 6 is made in the following manner:

Two negative zinc plates described above are placed on a sheet of "Viskon" 30, in vertically spaced relationship and on a line which is parallel to one of the sides of said sheet and adjacent said side. The two plates are then rolled in the "Viskon" sheet so that one turn of the "Viskon" encompasses the plate. This assembly is then placed on a sheet of silver cellulosate film 28, and rolled in a similar manner so that two turns of the silver cellulosate are wrapped around the plates. In a like fashion one turn of nylon 26 is rolled around the plates. The assembly is then folded along a horizontal line between the negative zinc plates, thus forming a U.

The silver cellulosate film preferably has a thickness of about .0010 in. and is prepared by treating cellulose film with a silver salt in aqueous solution. The "Viskon" separator, which is also of the semi-permeable type, consists of a silicone treated non-woven rayon fabric processed from viscose rayon fibers and a liquid cellulose binder. It has a weight of about 15.1 to 19.7 grams per square yard and a thickness of about .013 to .023 inch.

In the assembly described above the outside envelope of the U-wrap is a single turn of nylon whereas the outside envelope of the accordion wrap consists of two layers of nylon. In another embodiment of the present invention only one outer turn of nylon is disposed between the U-wrap and the accordion wrap. This may encompass either the U-wrap or the accordion wrap.

In still another modification of this invention a single turn of nylon will constitute the outside covering of both the U-wrap and the accordion wrap.

The manner of assembling the U and accordion sections of the separator arrangement is best shown in FIG. 1. As will be seen, the legs of the U section 6 are interleaved between adjacent sections of the accordion 4 so that a negative electrode is always adjacent a positive electrode. The electrode assembly made in this manner is then inserted in the battery casing 16 and the leads 12 and 14 are attached to the appropriate battery terminals in any suitable fashion. The electrolyte 18 is then added and the battery is ready for use.

In the modification of this invention shown in FIGS. 4 and 5, a negative electrode, as described above, is inserted in a bag 32, made of several layers of separator material. The composition of the bag is best seen in FIG. 5 and consists of 1 layer, 34, of nylon; 2 layers, 36, of silver cellulosate film; and 1 layer, 38, of "Viskon." Bag 32 is sealed at the bottom by means of a pinch clip 33. However, a variety of means may be used to seal the bottom of the bag. If the separator materials are fusible the bottom of the bag may be closed by heat sealing. Furthermore, the sheets may be glued or the ends thereof may be rolled up to form an end closure.

The second part of this assembly is a U-wrap 40, which comprises one outer layer, 42, of nylon; 3 layers 44, of "P" separator as described above; and 2 inner layers 46, of nylon. A positive electrode 41 is placed in each leg of the U.

To test the effectiveness of the separate wrapping of the positive and negative electrodes in maintaining the shape of the zinc electrode in a silver-zinc cell as described above and to test the effectiveness of wrapping each of the electrodes with an outer separator material which functions as a wick in attracting the electrolyte between the electrodes, the following assemblies were made:

*First group*

An accordion wrap containing preshaped positive silver electrodes and a U-wrap containing preshaped negative zinc oxide electrodes were prepared as described above. The accordion wrap contained 2 inner layers of nylon and 3 outer layers of "P" separators. The U-wrap contained 2 outer layers of silver cellulosate film and 2 inner layers of "Viskon." This arrangement is shown graphically in FIG. 6 and is referred to as the standard split-wrap arrangement.

*Second group*

A second assembly was prepared which was the same as that described under first group above except that an extra outer layer of nylon was added to both the accordion wrap and the U-wrap. This is a modified split wrap and is shown in FIG. 7.

*Third group*

In this group the positive electrode was wrapped in a U-wrap whereas the negative electrode was left unwrapped. This is referred to as the normal wrap. To be able to compare the performance of cells made with electrodes wrapped in this manner with that of cells conforming to Group 2, the same number and types of wrappings were employed as in the cells of Group 2. Furthermore, the order in which the various layers of wrappings occur between the positive and negative electrodes was maintained. The only difference thus was the fact that in this group the negative electrodes were not wrapped.

The wrappings between the positive and negative electrodes are as follows: two inside layers of nylon, 3 layers of "P" separator materials, 2 intermediate layers of nylon, 2 layers of silver cellulosate film, and 2 layers of "Viskon."

The electrode assemblies described above were used to construct cell packs which were identical in all other respects. Each cell pack consisted of 3 cells and each was wrapped in silver sheet. Each of the packs was tested under the same conditions over approximately 100 cycles and for 6½ months. The results of the test are summarized in the table below:

| Group | Type | Zn shape loss, percent | Zn penetration | Ag sheet wrap | Separator state | Average capacity of 3 cells |
| --- | --- | --- | --- | --- | --- | --- |
| 1 | Standard split wrap | 15 | 3 turns of separator | Zn plated | Relatively dry | Cycle 100:19.8 AH. |
| 2 | Split wrap with nylon inserted. | 15 | None | Clean | Well wet | Cycle 110:21.1 AH. |
| 3 | Normal wrap with nylon inserted. | 40 | do | Zn plated | do | Cycle 110:17.1 AH. |

An examination of the results clearly establishes the following:

(1) That a reduction in the shape loss of the zinc electrode and an increase in capacity attend the use of the split wrap construction of this invention when compared with the normal wrap.

(2) That the performance of the split wrap may be further improved by using wrapping of wick-like materials, e.g. woven nylon fabric, as the outside layers between the electrodes which is manifested by an increase in capacity of the cells and a decrease in zinc penetration through the separator material.

Numerous modifications of the described embodiments of this invention can be made without departing from the spirit and scope thereof, it being understood that the invention is not to be limited to specific details of the foregoing disclosure except as defined in the appended claims.

What is claimed is:

1. An electrode assembly for alkaline electrochemical electric-current-producing batteries, comprising at least one first electrode consisting predominantly of a first active material, at least two second electrodes flanking said first electrode and consisting predominantly of a second active material, first separator means wound around and enveloping said first electrode, and second separator means wound jointly around and individually enveloping both of said second electrodes, said second separator means being in contact with said first separator means, each of said separator means including at least one inner layer of semi-permeable sheet material and an outermost layer of bibulous sheet material, one of said active materials being silver/silver oxide, the other of said active materials being selected from the group which consists of zinc/zinc oxide and cadmium/cadmium oxide.

2. An electrode assembly for alkaline electrochemical electric-current-producing batteries, comprising at least one first electrode consisting predominantly of a first active material, at least two second electrodes flanking said first electrode and consisting predominantly of a second active material, first separator means wound around and enveloping said first electrode, and second separator means wound jointly around and individually enveloping both of said second electrodes, said second separator means being in contact with said first separator means, each of said separator means including at least one inner layer of semi-permeable sheet material and an outermost layer constituted by a bibulous fabric of synthetic fibers, one of said active materials being silver/silver oxide, the other of said active materials being selected from the group which consists of zinc/zinc oxide and cadmium/cadmium oxide.

3. An assembly as defined in claim 2 wherein said fibers consist of nylon.

4. An electrode assembly for alkaline electrochemical electric-current-producing batteries, comprising a set of first electrodes of one polarity, a set of second electrodes of the opposite polarity interleaved with said first electrodes, first separator means wound around and enveloping each of said first electrodes, and second separator means wound jointly around pairs of said second electrodes while individually enveloping the electrodes of each pair, said second separator means of each pair of second electrodes being in contact with the respective first separator means of a first electrode juxtaposed with the respective pair, each of said separator means including at least one inner layer of semi-permeable sheet material and an outermost layer of bibulous sheet material, the electrodes of one of said sets consisting predominantly of silver/silver oxide active material, the electrodes of the other set consisting predominantly of an active material selected from the group which consists of zinc/zinc oxide and cadmium/cadmium oxide.

5. An assembly as defined in claim 4 wherein said outermost layer consist of a woven nylon fabric.

References Cited by the Examiner

UNITED STATES PATENTS

| | | |
|---|---|---|
| 2,594,710 | 4/52 | Andre. |
| 2,597,118 | 5/52 | Brooks et al. |
| 2,610,219 | 9/52 | Yardney _____ 136—30 |
| 2,701,271 | 2/55 | Moutner et al. |
| 2,851,509 | 9/58 | Pasquale et al. _____ 136—6 |
| 2,880,259 | 3/59 | Nowotny _____ 136—111 |
| 2,906,802 | 9/59 | Andre _____ 136—6 |
| 3,013,099 | 12/61 | Mendelsohn _____ 136—146 |

JOHN H. MACK, *Primary Examiner.*

MURRAY TILLMAN, *Examiner.*